(12) United States Patent
Lonner et al.

(10) Patent No.: US 10,233,008 B2
(45) Date of Patent: Mar. 19, 2019

(54) FRESHNESS PRESERVING FOOD CONTAINER

(71) Applicant: GUAC LOCK LLC, White Plains, NY (US)

(72) Inventors: Sharon Lonner, Scarsdale, NY (US); Jane Caplan, White Plains, NY (US); Ran Lerner, New York, NY (US); Flavio De Roma Leao, Pearl River, NY (US)

(73) Assignee: Guac-Lock LLC, White Plains, NY (US)

( * ) Notice: Subject to any disclaimer, the term of this patent is extended or adjusted under 35 U.S.C. 154(b) by 0 days.

(21) Appl. No.: 15/449,813

(22) Filed: Mar. 3, 2017

(65) Prior Publication Data

US 2017/0174411 A1  Jun. 22, 2017

Related U.S. Application Data

(63) Continuation-in-part of application No. 15/247,573, filed on Aug. 25, 2016, which is a continuation of
(Continued)

(51) Int. Cl.
*B65D 21/08* (2006.01)
*B65D 81/24* (2006.01)
(Continued)

(52) U.S. Cl.
CPC ......... *B65D 81/24* (2013.01); *A47G 23/0633* (2013.01); *A47J 47/02* (2013.01);
(Continued)

(58) Field of Classification Search
CPC ............. B05B 11/0037; B05B 11/3056; B05C 17/00576; B65D 21/068; B65D 21/08; B65D 21/083; B65D 21/086; B65D 51/1672; B65D 83/0005; B65D 83/0072; B65D 83/386
(Continued)

(56) References Cited

U.S. PATENT DOCUMENTS

| | | | | |
|---|---|---|---|---|
| 3,053,410 A | * | 9/1962 | Eaddy ................... | B65H 75/16 19/159 R |
| 3,648,873 A | * | 3/1972 | Grobbel ................. | A61J 9/001 215/11.3 |
| 3,908,852 A | * | 9/1975 | Ricobene ............... | A45C 11/20 206/545 |
| 3,920,156 A | * | 11/1975 | Hicks .................. | A47G 19/183 222/326 |
| 4,203,353 A | * | 5/1980 | Burnham ............... | F16J 15/324 92/159 |

(Continued)

*Primary Examiner* — Anthony D Stashick
*Assistant Examiner* — Kaushikkumar A Desai
(74) *Attorney, Agent, or Firm* — Mintz, Levin, Cohn, Ferris, Glovsky and Popeo, P.C.

(57) ABSTRACT

A container for preserving the freshness of a stored food product is disclosed. The container has a receptacle with a piston and seal arrangement that creates a variable volume for food storage. A vent and seal arrangement allows for the removal of air as the piston is moved within the receptacle to reduce the volume within. A removable engaging member pushes the piston upward in order to reduce the inner volume of the container as the food stored in the container is consumed. This reduction in space and associated removal of air inhibit the oxidation and spoilage of many popular foods such as guacamole. With the engaging member removed, the container is also useful for serving the stored food product.

20 Claims, 24 Drawing Sheets

Related U.S. Application Data application No. 14/514,903, filed on Oct. 15, 2014, now abandoned.

(60) Provisional application No. 61/906,056, filed on Nov. 19, 2013.

(51) Int. Cl.

| | | |
|---|---|---|
| *B65D 45/16* | (2006.01) | |
| *B65D 51/16* | (2006.01) | |
| *A47G 23/06* | (2006.01) | |
| *A47J 47/02* | (2006.01) | |
| *B65D 43/02* | (2006.01) | |
| *B65D 47/32* | (2006.01) | |
| *B65D 53/02* | (2006.01) | |

(52) U.S. Cl.
CPC .......... *B65D 21/086* (2013.01); *B65D 43/02* (2013.01); *B65D 45/16* (2013.01); *B65D 47/32* (2013.01); *B65D 51/1683* (2013.01); *B65D 53/02* (2013.01)

(58) Field of Classification Search
USPC ......... 206/91; 220/324, 4.29, 4.32, 8, 23.88, 220/529, 530, 532, 534, 544, 573.5, 578, 220/625, 629–630, 635, 720, 745; 222/160, 162, 319, 390, 386–387, 405, 222/524, 562; 229/101; 426/111–112, 426/118, 431
See application file for complete search history.

(56) References Cited

U.S. PATENT DOCUMENTS

| | | | | |
|---|---|---|---|---|
| 4,742,940 | A * | 5/1988 | Wilkinson | B65D 83/0005 222/162 |
| 4,860,892 | A * | 8/1989 | Roberts | G03C 3/00 206/389 |
| 4,979,629 | A * | 12/1990 | Askerneese | A61J 9/001 215/11.1 |
| 5,033,631 | A * | 7/1991 | Nightingale | A61J 9/001 215/11.1 |
| 5,226,563 | A * | 7/1993 | Coggiola | B05B 11/0027 222/153.01 |
| 5,295,615 | A * | 3/1994 | Gentile | B65D 83/0005 222/327 |
| 5,524,783 | A * | 6/1996 | Popoff | A61J 9/001 215/11.1 |
| 5,540,557 | A * | 7/1996 | Carson | B65D 81/2023 141/65 |
| 5,547,107 | A * | 8/1996 | Boiardi | B65D 83/0005 222/1 |
| 6,026,685 | A * | 2/2000 | Weterrings | G01F 19/00 220/8 |
| 6,138,848 | A * | 10/2000 | Fermo | A61J 9/00 215/11.1 |
| 6,302,286 | B1 * | 10/2001 | Witherspoon | A61J 11/008 215/11.1 |
| 2004/0232016 | A1 * | 11/2004 | Dietrich | A63B 55/404 206/315.3 |
| 2007/0012696 | A1 * | 1/2007 | Levie | B65D 21/086 220/8 |
| 2014/0175131 | A1 * | 6/2014 | Abrams | B65D 83/0005 222/390 |

\* cited by examiner

SECTION B-B

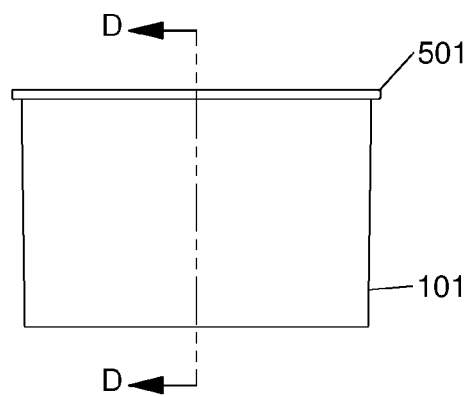
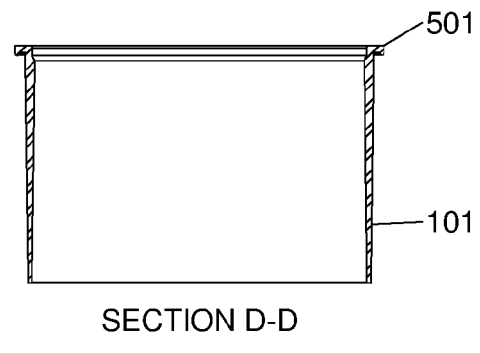
Fig.21  Fig. 22
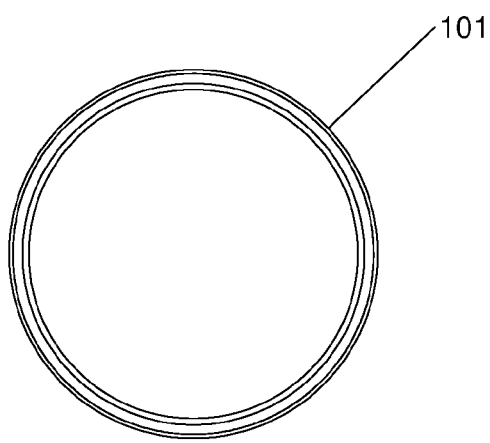
Fig. 23

SECTION E-E

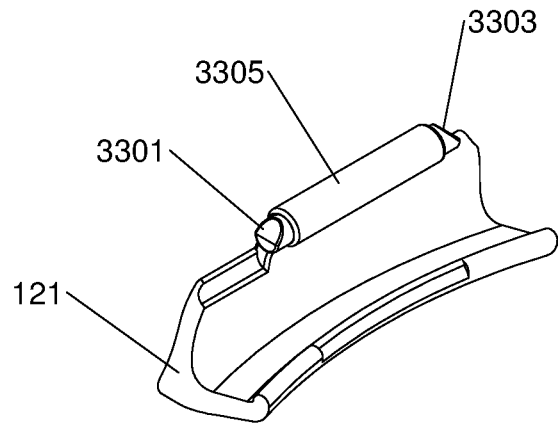
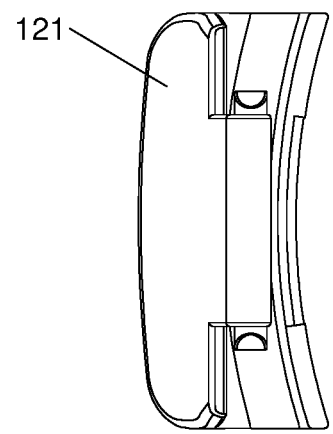
Fig. 33　　　　　　　　Fig. 34
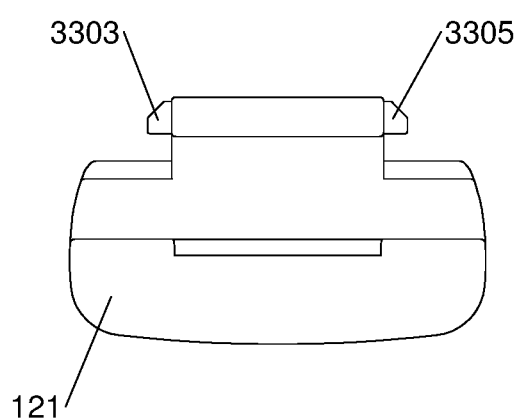
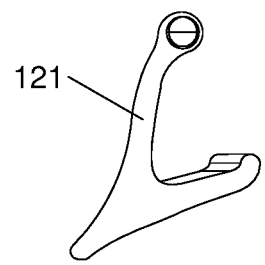
Fig. 35　　　　　　　　Fig. 36

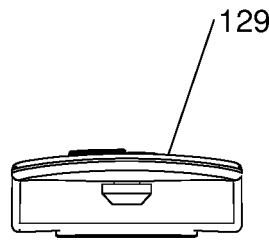
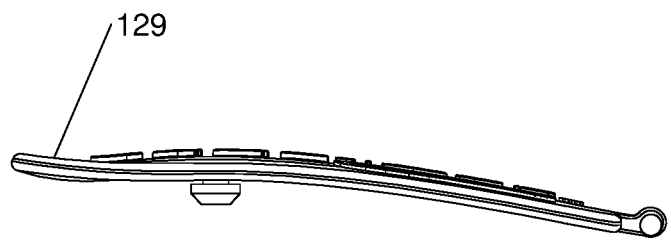
Fig. 39      Fig. 40
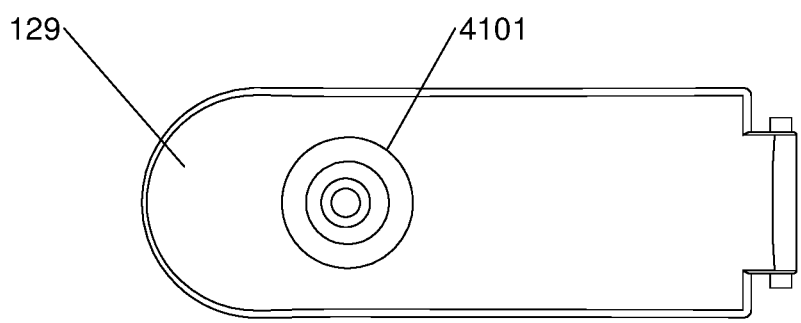
Fig. 41

SECTION F-F

FRESHNESS PRESERVING FOOD CONTAINER

CROSS REFERENCE TO RELATED PATENT APPLICATIONS

This application is a Continuation-in-Part of U.S. patent application Ser. No. 15/247,573 filed Aug. 25, 2016 entitled "Stay-Fresh Food Container" by Sharon Lonner et al., which is a continuation of U.S. patent application Ser. No. 14/514, 903 filed Oct. 15, 2014 entitled "Stay-Fresh Food Container", which claims priority to U.S. Provisional Patent Application Ser. No. 61/906,056 filed on Nov. 19, 2013 the entire disclosures of which are incorporated herein by reference.

BACKGROUND OF THE INVENTION

1. Field of the Invention

This invention relates generally to food storage containers, and more particularly to a container with a variable inner volume for preserving freshness of an easily oxidized food while also providing for storage and serving functionality.

2. Description of Related Art

Not all food products that are made or purchased are consumed immediately. This necessitates a suitable storage device for the food product surplus. In addition, many in the culinary arts or simply those that create food products require a suitable storage device to preserve their creations. Modern storage devices are often bowls, canisters, boxes, and variously sized and shaped containers. Many of these containers have lids to enclose the created food product to prevent spills and spoilage. While such storage devices are perfectly suited to many food products, the air contained within these storage devices during use can contribute to faster degradation and spoilage of the food product stored within. Many food products that are vegetable or fruit based, or even meat based, will not only dry out when exposed to air, they will also discolor and break down, making the food product less desirable or even inedible. An example of such a food product that degrades rapidly in the presence of air is guacamole, an avocado based spread or dip that has become very popular in recent years, and is well suited for accompanying chips and Mexican dishes, often being served with corn chips of various shapes and recipes. Guacamole is notorious for turning an unpleasant brown color at the surface when exposed to air. If the prepared guacamole is stored in many of the food storage containers that are readily available today, the entrapped air in the food storage container quickly results in discoloration and breakdown of the guacamole that in turn results in spoilage and waste. This problem of food degradation is often caused by rapid oxidation of various components of the food product. Large commercial food processors will often use vacuum packaging or nitrogen packaging to provide longer shelf life for their products. While such systems work well, they are typically expensive and not very applicable to a home kitchen environment. In addition, they are not well suited to many food products such as dips or spreads.

What is therefore needed is a container that preserves the freshness of an easily oxidized food product, is easy to use and cost effective. It is thus an object of the present invention to provide a container that preserves the freshness of an easily oxidized food.

These and other objects of the present invention are not to be considered comprehensive or exhaustive, but rather, exemplary of objects that may be ascertained after reading this specification and claims with the accompanying drawings.

BRIEF SUMMARY OF THE INVENTION

In accordance with the present invention, there is provided a container for preserving the freshness of a stored food product, the container comprising a generally cylindrical receptacle having a first open end, an opposing second open end and an inner diameter, a piston having an upper surface and an exterior diameter that is slightly less than the interior diameter of the generally cylindrical receptacle to allow for placement of the piston within the generally cylindrical receptacle to form a food storage chamber of variable volume; a lower surface of the piston defined by a cylindrical recess; an upper support surface that covers the piston; a peripheral wiper seal that creates a generally air and liquid tight seal between the exterior diameter of the piston and the interior diameter of the generally cylindrical receptacle; a generally cylindrical engaging member having an exterior diameter that is less than the interior diameter of the generally cylindrical receptacle and a coupling with a diameter that is less than the external diameter of the generally cylindrical engaging member and with the coupling capable of engaging within the cylindrical recess of the lower surface of the piston to allow for movement of the piston in the generally cylindrical receptacle in order to vary the volume of the formed food storage chamber, a lid that is removably securable to the first open end of the generally cylindrical receptacle; and a vent located on the lid.

The foregoing paragraph has been provided by way of introduction, and is not intended to limit the scope of the invention as described in this specification, claims and the attached drawings.

BRIEF DESCRIPTION OF THE DRAWINGS

The invention will be described by reference to the following drawings, in which like numerals refer to like elements, and in which:

FIG. 21 is a side view of the cylindrical receptacle of the freshness preserving food container;

FIG. 22 is a cross-sectional view of the cylindrical receptacle of the freshness preserving food container taken along line D-D of FIG. 21;

FIG. 23 is a bottom plan view of the cylindrical receptacle of the freshness preserving food container;

FIG. 33 is a perspective view of a latch of the freshness preserving food container;

FIG. 34 is a top plan view of a latch of the freshness preserving food container;

FIG. 35 is a bottom plan view of a latch of the freshness preserving food container;

FIG. 36 is a side view of a latch of the freshness preserving food container;

FIG. 39 is an end view of the lever cap of the freshness preserving food container;

FIG. 40 is a side plan view of the lever cap of the freshness preserving food container;

FIG. 41 is a bottom plan view of the lever cap of the freshness preserving food container;

Figure 1:
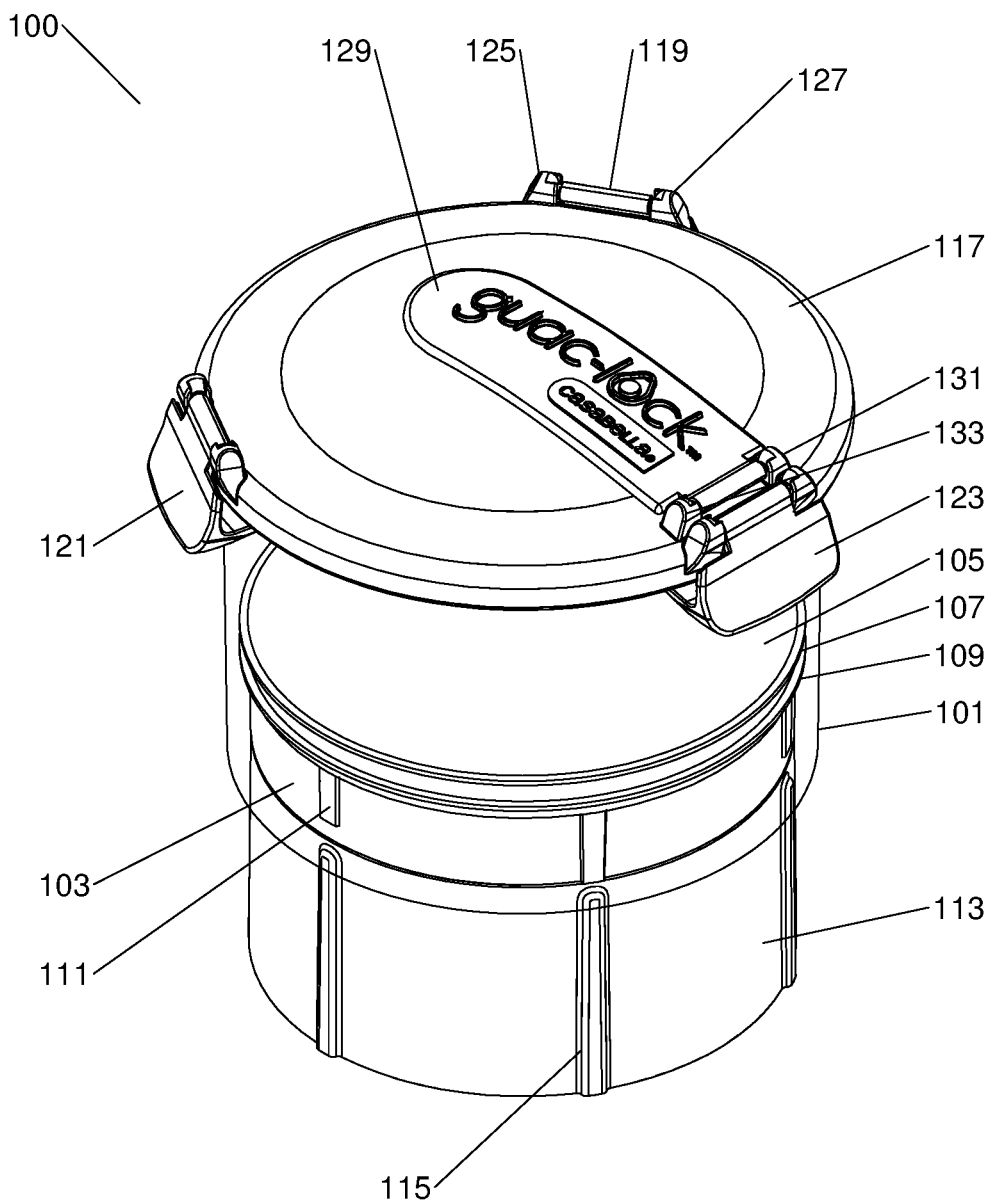
FIG. 1 is a perspective view of a freshness preserving food container of the present invention with a removable engaging member in place.

The attached figures depict various views of the present invention in sufficient detail to allow one skilled in the art to make and use the present invention. These figures are exemplary, and depict a preferred embodiment; however, it will be understood that there is no intent to limit the invention to the embodiment depicted herein. On the contrary, the intent is to cover all alternatives, modifications, and equivalents as may be included within the spirit and scope of the invention as defined by this specification, claims and drawings.

DESCRIPTION OF THE PREFERRED EMBODIMENTS

A Freshness Preserving Food Container is described and depicted by way of this specification and the attached drawings.

For a general understanding of the present invention, reference is made to the drawings. In the drawings, like reference numerals have been used throughout to designate identical elements.

The present invention and the various embodiments described and depicted herein, provides, among other things, a novel device for extending the storage life of a food product, providing a variable volume food storage and serving container that reduces or eliminates the oxidation of many food products that makes them aesthetically undesirable or inedible.

It should first be noted that the freshness preserving food container may preferably be made from any plastic suitable for food storage, but may also be made from glass, stainless steel, ceramic, or the like. Plastics should be FDA grade, and may include, for example, polypropylene. The various components of the freshness preserving food container may be made by injection molding, blow molding, casting, 3D printing, extruding, forming, machining, and the like.

FIGS. 1-4 show perspective views of the freshness preserving food container. Taken collectively, these figures also depict the various in-use states of the freshness preserving food container to also allow one to fully appreciate how to use the present invention.

FIG. 1 is a perspective view of the freshness preserving food container 100 with a removable engaging member 113 in place. One can see the piston 103 in a downward position, allowing for maximum volume within the freshness preserving food container 100.

The freshness preserving food container 100 has essentially a moveable bottom in the form of a piston 103 and related upper support surface 105 and peripheral wiper seals 107 and 109. A generally cylindrical receptacle 101 forms the walls of the container 100 and has a rust open end, an opposing second open end and an inner diameter. The first open end is the end that is generally upward when in use, and retains the lid 117. The generally cylindrical receptacle may, in some embodiments of the present invention, be made from a clear plastic or clear polymer such as a copolyester to allow viewing of the food product within the container 100. Viewing of the food product allows the user to determine if the inner volume of the container 100 has been reduced sufficiently to remove any remaining airspace within the container 100 that could cause degradation of the stored food product. It should be noted that the figures provided herein are depicted with a clear cylindrical receptacle, and the inner components such as the piston 103, engaging member 113, and upper support surface 105 are clearly visible as a result.

Forming the bottom of the freshness preserving food container 100 is a piston 103 having an upper surface and an exterior diameter that is slightly less than the interior diameter of the generally cylindrical receptacle to allow for placement of the piston 103 within the generally cylindrical receptacle 101 to form a food storage chamber of variable volume. The piston 103, as later described, has a lower surface or underside that is defined by a cylindrical recess. This recess, which will become evident in subsequent figures, allows the engaging member 113 to couple with and evenly move the piston 103 within the cylindrical receptacle 101. The piston 103 may be made from a plastic that is preferably food safe. Ridges 111 may optionally be present around the periphery of the piston 103 to provide alignment of the piston 103 within the generally cylindrical receptacle. The piston 103 may also have a peripheral groove, recess, or similar feature to allow for retention of an upper support surface 105. The upper support surface 105 covers the piston to provide not only a removable cover for cleaning purposes, but also to form seals around the periphery of the covered piston that create a generally air and liquid tight seal between the exterior diameter of the piston and the interior diameter of the generally cylindrical receptacle. In FIG. 1 and subsequent figures, a first peripheral wiper seal 107 and a second peripheral wiper seal 109 can be seen. The upper support surface 105 and the associated wiper seals 107 and 109 are mad from a soft durometer material such as a rubber thermoplastic elastomer, or a silicone composition to conform to and cover the piston 103 and to allow the wiper seals 107 and 109 to create a moveable or slideable seal with the wall of the cylindrical receptacle 101. The upper support surface 105 also has an inner protrusion, ridge, wall or the like that engages with a peripheral channel or groove in the piston 103 for retention thereof.

Also seen in FIG. 1 is a generally cylindrical engaging member 113 having an exterior diameter that is less than the interior diameter of the generally cylindrical receptacle 101 and a coupling (see FIG. 5, 503) with a diameter that is less than the external diameter of the generally cylindrical engaging member 113 and with the coupling 503 capable of engaging within the cylindrical recess of the lower surface of the piston 103 to allow for movement of the piston 103 in the generally cylindrical receptacle 101 in order to vary the volume of the formed food storage chamber. The cylindrical engaging member 113 may also have ridges 115 for alignment of the cylindrical engaging member 113 with the cylindrical receptacle 101 such that the piston 103 receives the cylindrical engaging member 113 and is properly aligned when in use.

A lid 117 can also be seen that is removably securable to the first open end of the generally cylindrical receptacle. The lid 117 may have a plurality of latches such as the first latch 119, the second latch 121 and the third latch 123. The latches may have a pin or other feature that engages with a feature on the lid 117 such as a socket or receiver. In FIG. 1, a first retention socket 125 and a second retention socket 127 can be seen that hingeably connect the latch to the lid.

A vent is located on the lid 117 to allow the release of air when the piston 103 travels upward to reduce the inner volume of the freshness preserving food container 100. The vent 513 can be seen in FIG. 5. In FIG. 1, the vent 513 is covered by a lever cap 129 that has a seal to plug the vent once the inner volume of the freshness preserving food container 100 has been reduced by movement of the piston 103.

Figure 2:
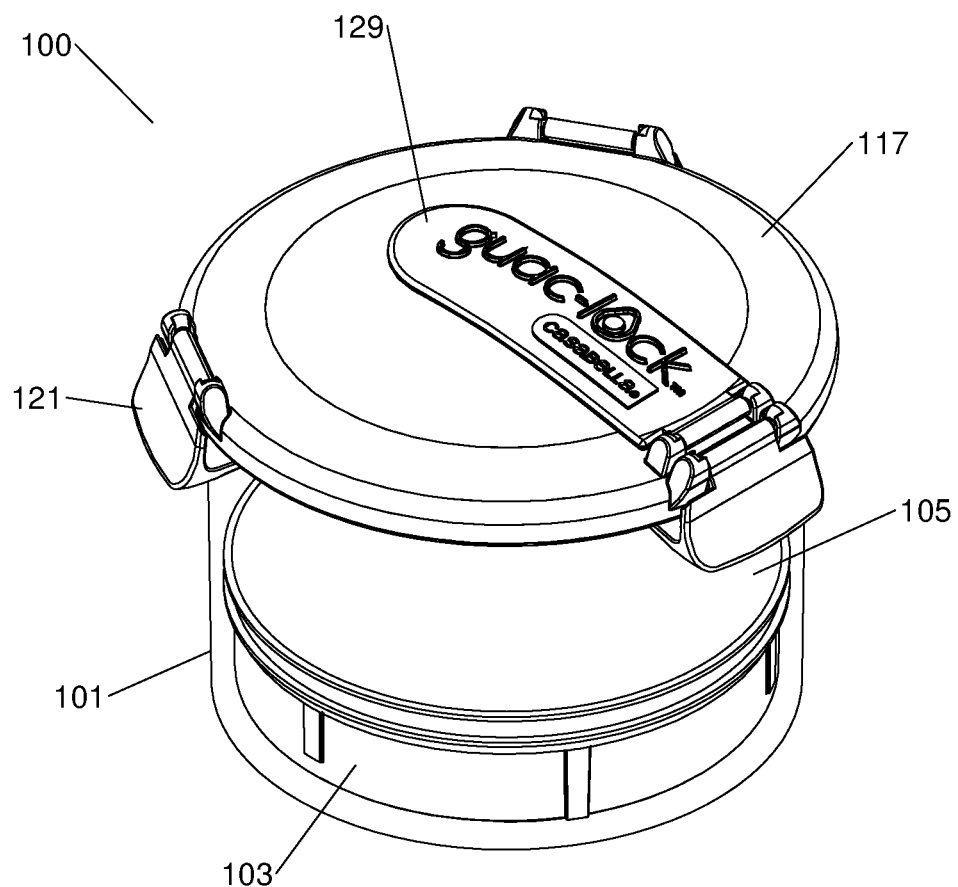
FIG. 2 is a perspective view of the freshness preserving food container with the engaging member removed.

FIG. 2 is a perspective view of the freshness preserving food container 100 with the engaging member 113 removed. The engaging member 113 can be removed when the freshness preserving food container 100 is in use. A snug but easily removable fit between the coupling of the engaging member 113 and the underside of the piston 103 allows for ease of piston travel while maintaining the alignment necessary for the piston 103 to reduce the inner volume of the freshness preserving food container 100 without becoming skewed or otherwise misaligned within the cylindrical receptacle 101.

Figure 3:
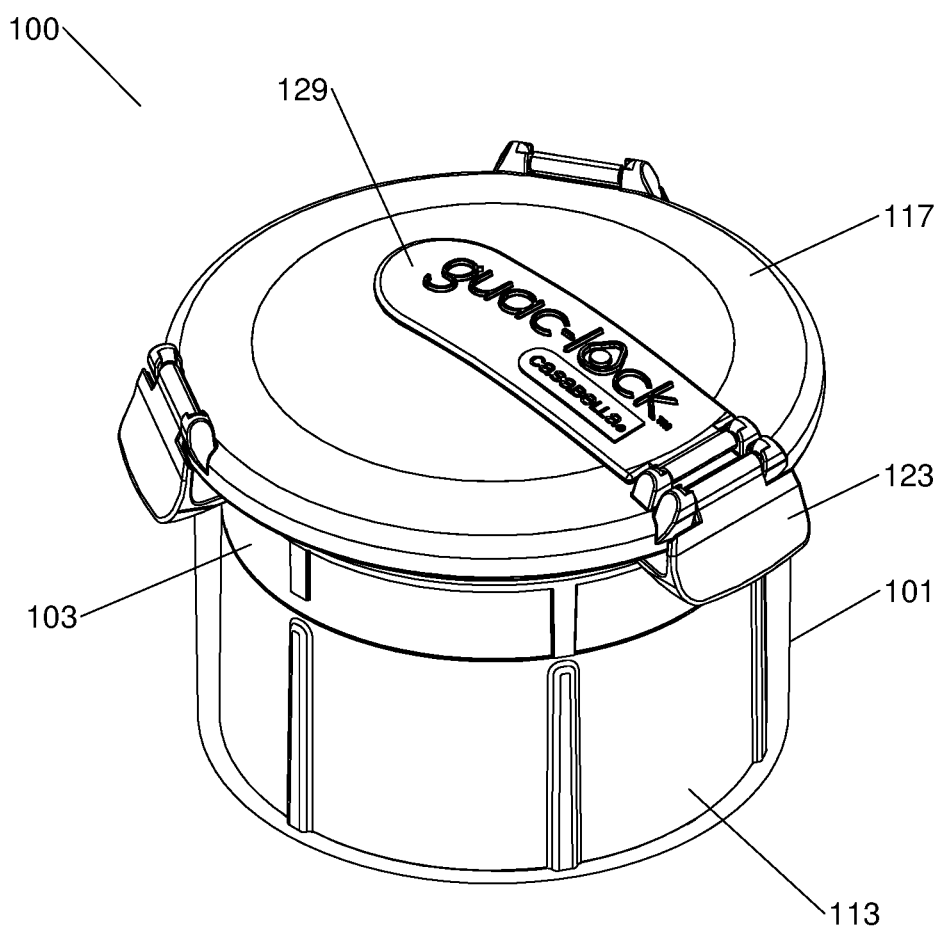
FIG. 3 is a perspective view of the freshness preserving food container of the present invention with the engaging member compressing the food storage volume.

FIG. 3 is a perspective view of the freshness preserving food container 100 with the engaging member 113 in place and coupled with the piston 103 to compress or otherwise reduce the food storage volume through inward travel of the piston into the cylindrical receptacle 101.

Figure 4:
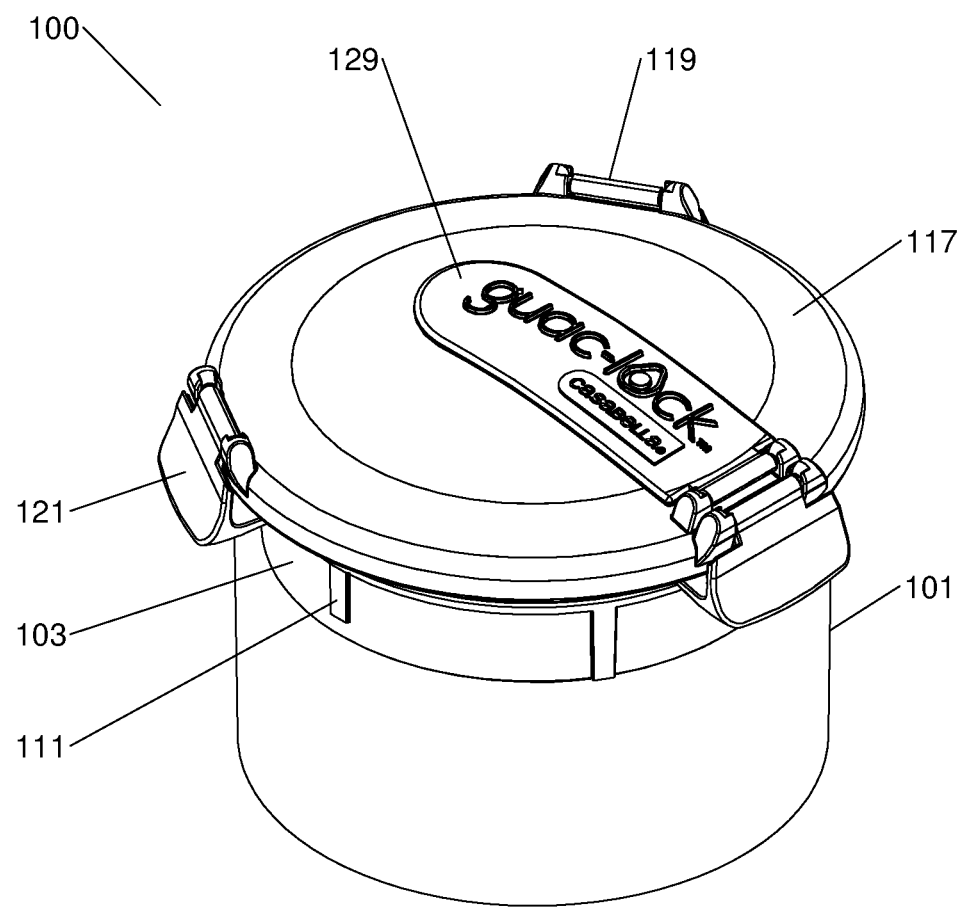
FIG. 4 is a perspective view of the freshness preserving food container of the present invention with the food storage volume compressed and the engaging member removed.

FIG. 4 is a perspective view of the freshness preserving food container 100 with the food storage volume compressed or otherwise reduced and the engaging member 113 removed. This position would be typical of a situation where the food product being stored has been mostly consumed or there is only a small amount of food left in the freshness preserving food container.

Figure 5:
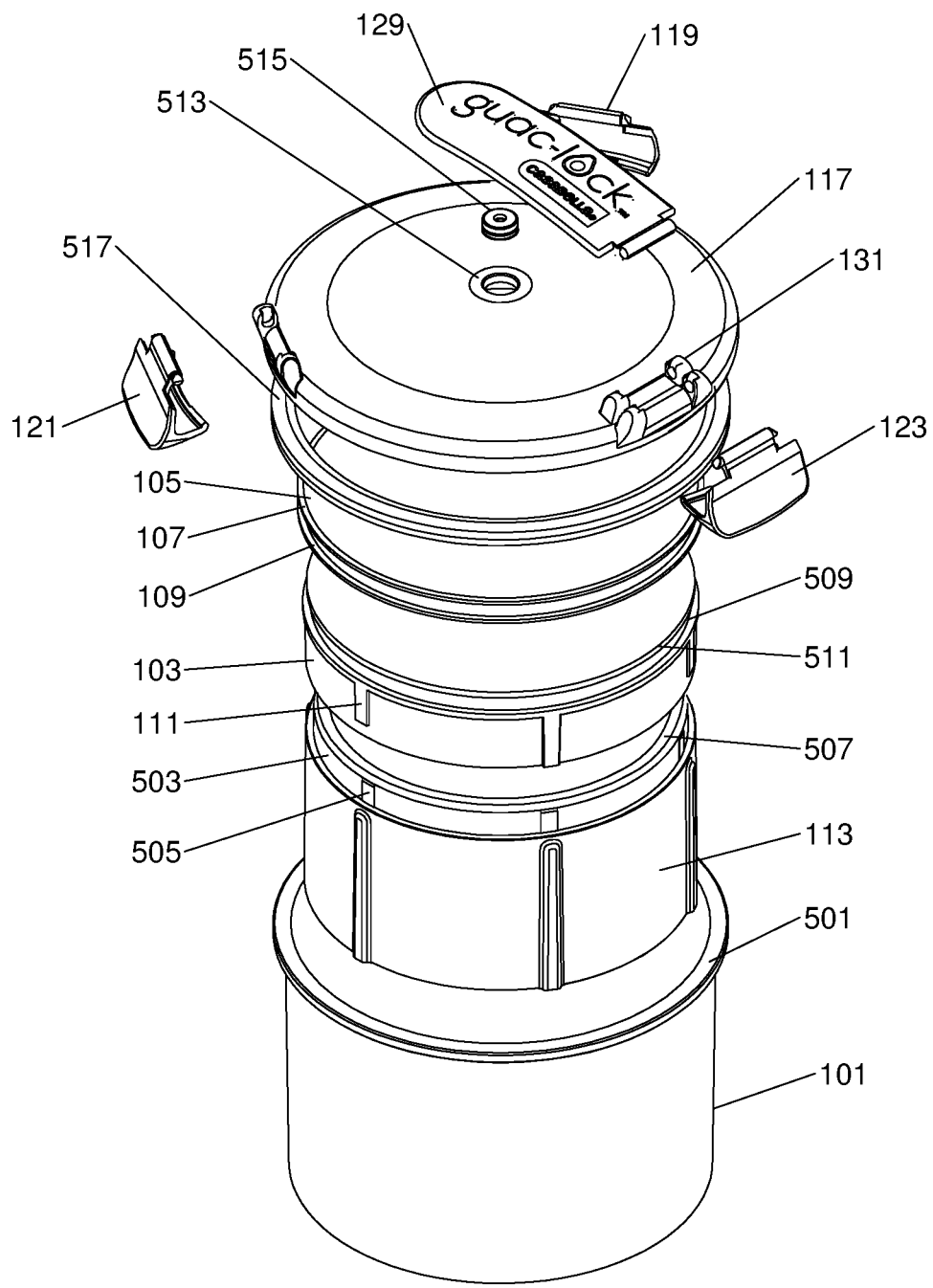
FIG. 5 is an exploded view of the freshness preserving food container.

FIG. 5 is an exploded view of the freshness preserving food container 100. While the way in which the various components are assembled is evident by this figure and the accompanying figures, a further description of some of the aspects of the present invention that may not have been visible in previous figures is provided. The cylindrical receptacle 101 may have a peripheral flange 501 at the rust open end of the generally cylindrical receptacle 101. The peripheral flange 501 is an outward flare that serves to receive and properly seat the lid 117. The lid itself may have a recess or depression around the lower periphery of the lid 117 that may also contain an annular sealing ring 517. The annular sealing ring is a soft durometer material that serves as a gasket. The peripheral flange 501 may also serve as a retention edge for the latches 119, 121 and 123 to grab or otherwise engage with.

The coupling 503 of the engaging member 113 can be seen clearly. The coupling 503 in one embodiment is a reduced diameter portion of the engaging member 113 with a diameter sufficient to engage with the underside or a cylindrical recess of the lower surface of the piston 103. The coupling 503 cylindrically mates with the piston 103 in order to allow a user to push the piston 103 upward, thus reducing the inner volume of the freshness preserving food container 100. The coupling 503, part of the engaging member 113, transitions from the coupling 503 to the engaging member body with a step, edge or transition that allows the coupling 503 to only be inserted a given distance into the hollow underside cylindrical recess of the piston 503. This step or transition ensures that the engaging member 113 is inserted far enough to uniformly push the piston 103, but not so far that the removal of the engaging member 113 from the piston 103 is difficult. An insertion of the coupling from ¼ to ½ of the overall height of the piston 103 is an example of a preferred embodiment. The coupling flange 507 also eases the insertion and removal of the engaging member 113 with the piston 103, as the coupling flange 507 is configured radially inward to ease the diameter of the coupling flange 507 when it is first inserted into the underside of the piston 103. Coupling ridges 505 may also be seen around the periphery of the coupling 503 to facilitate alignment and removable coupling of the engaging member 113 with the piston 103. In some embodiments of the present invention, a coupling flange 507 may be present. The coupling flange 507 provides structural rigidity to the engaging member 113 and also softens an otherwise sharp edge.

As previously disclosed, the piston 103 may also contain a groove, recess, or slot to accommodate a feature on the upper support surface 105 that serves to retain the upper support surface 105 to the piston 103. Such a groove or recess may be bounded by a first peripheral guide 509 and a second peripheral guide 511.

A vent 513 can also be seen centered in the lid 117. In some embodiments of the present invention, the lid 117 is outwardly convex, with the vent 513 centered at the apex. This allows a stored food product to move upward while being compressed radially inward, removing air and preventing trapped air that could otherwise occur with a flat lid.

Once the piston 103 has traveled upward to reduce the inner volume of the freshness preserving food container with the vent open (lever cap 127 open), the lever cap 127 is pushed downward onto the lid 117. A sealing plug 515 is attached to the underside of the lever cap 129 such that it engages with and seals the vent 513.

Figure 6:
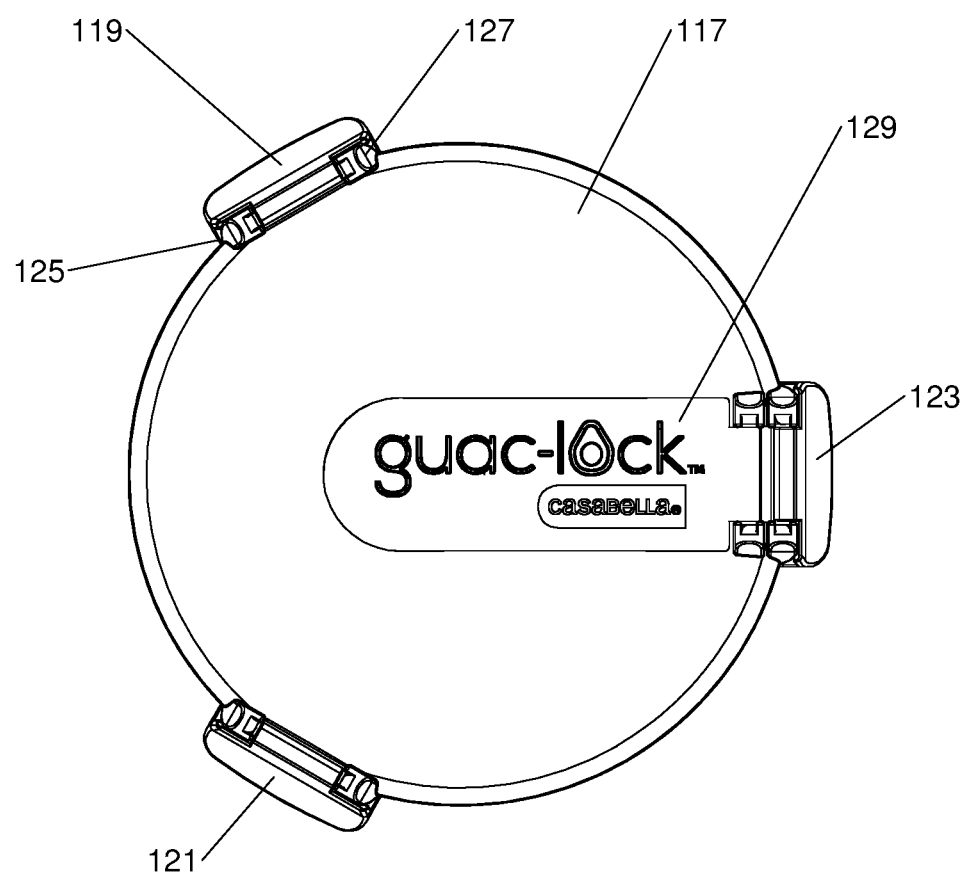
FIG. 6 is a top plan view of the freshness preserving food container.

FIGS. 6-9 depict further views of the freshness preserving food container 100. FIG. 6 is a top plan view of the freshness preserving food container 100. The lever cap 129 can be seen in the closed position. The lever cup 129 is hingeably connected to the lid with pins that engage with retention sockets, similar to the way in which the latches are connected to the lid.

Figure 7:
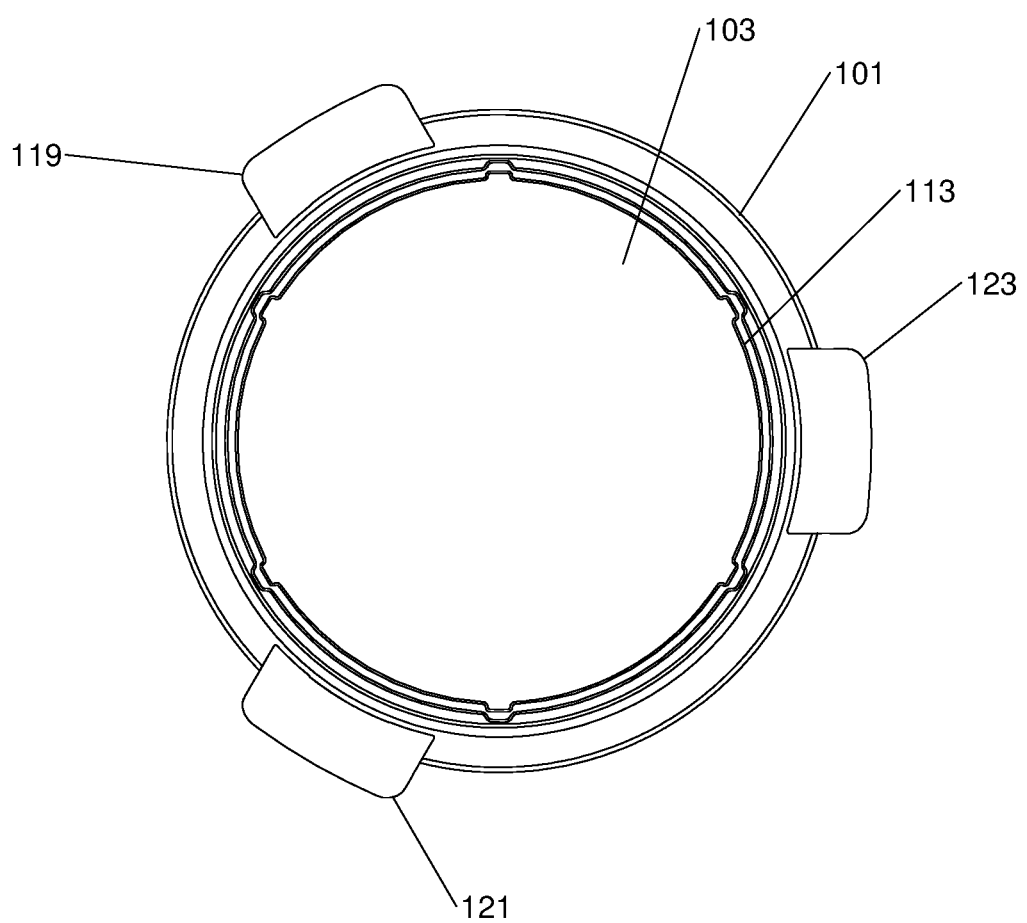
FIG. 7 is a bottom plan view of the freshness preserving food container.

FIG. 7 is a bottom plan view of the freshness preserving food container 100. The engaging member 113 can be seen along with the underside of the piston 103. The engaging member 113 is a cylindrical element with no top or bottom, which allows the underside of the piston to be visible. The latches 119, 121 and 123 can be seen in the closed (latched) position with a curved face engaging with the peripheral flange 501 (see FIG. 5).

Figure 8:
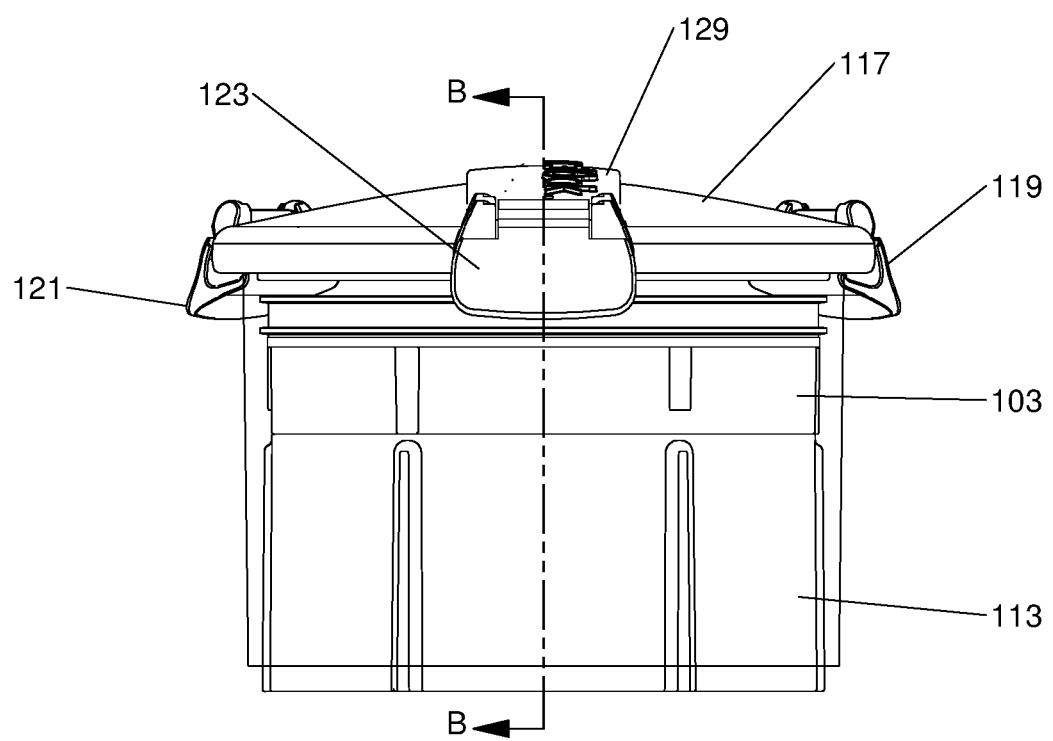
FIG. 8 is a side plan view of the freshness preserving food container.

FIG. 8 is a side plan view of the freshness preserving food container. The latches can be seen in the down (closed) position, resulting in an attached and sealed lid.

Figure 9:
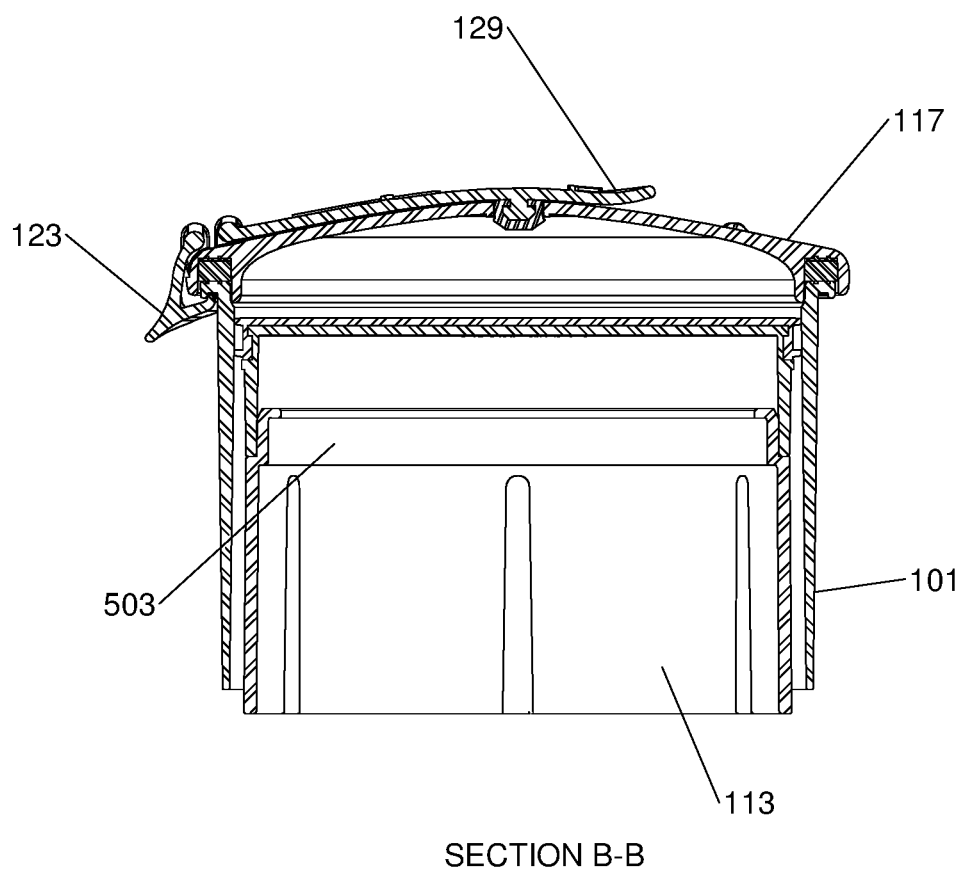
FIG. 9 is a cross sectional view of the freshness preserving food container taken along line B-B of FIG. 8.

FIG. 9 is a cross sectional view of the freshness preserving food container taken along line B-B of FIG. 8. The coupling 503 of the engaging member 113 can be clearly seen engaging with the piston 103. The outwardly convex shape of the lid 117 is also evident, along with the lever cap 129 and sealing plug arrangement that engages with and plugs the vent 513 of the lid 117.

Figure 10:
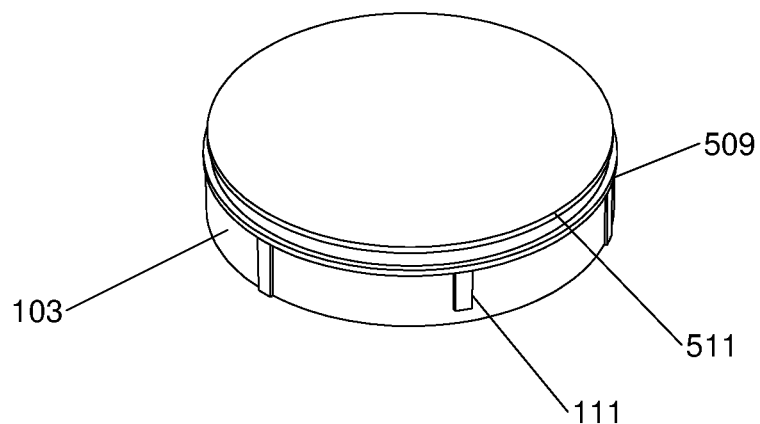
FIG. 10 is a perspective view of the piston of the freshness preserving food container.

FIG. 10 is a perspective view of the piston 103 of the freshness preserving food container 100. The first peripheral guide 509 and the second peripheral guide 511 can be seen forming a channel to receive the upper support surface 105, and in particular a peripheral protrusion, flange, or relief feature of the upper support surface 105.

Figure 11:
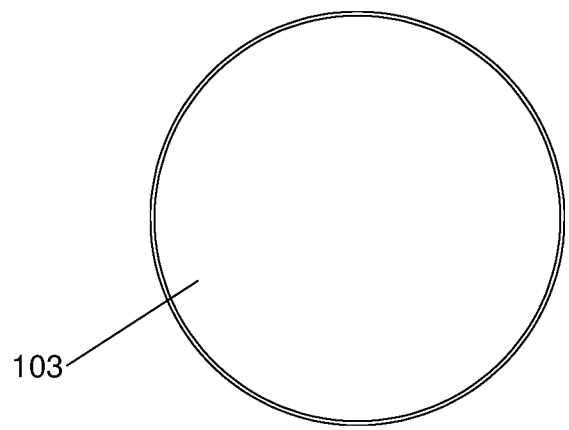
FIG. 11 is a top plan view of the piston of the freshness preserving food container.

FIG. 11 is a top plan view of the piston 103 of the freshness preserving food container 100. The surface is generally flat to receive the upper support surface 105, but may, in some embodiments, be convex, concave, or the like.

Figures 12, 13:
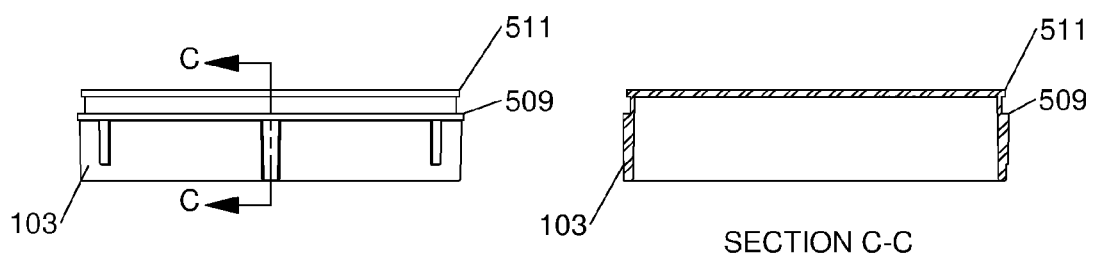
FIG. 12 is a side plan view of the piston of the freshness preserving food container.
FIG. 13 is a cross sectional view of the piston of the freshness preserving food container taken along line C-C of FIG. 12.

FIG. 12 is a side plan view of the piston 103 of the freshness preserving food container 100. A slight variation in diameter between the first peripheral guide 509 and the second peripheral guide 511 can be seen, to provide, among other things, ease of insertion of the piston 103 and attached upper support surface 105 into the cylindrical receptacle 101.

FIG. 13 is a cross sectional view of the piston 103 of the freshness preserving food container 100 taken along line C-C of FIG. 12. The cross hatching denotes material, showing the hollow underside that receives the engaging member 113 when in use.

Figure 14:
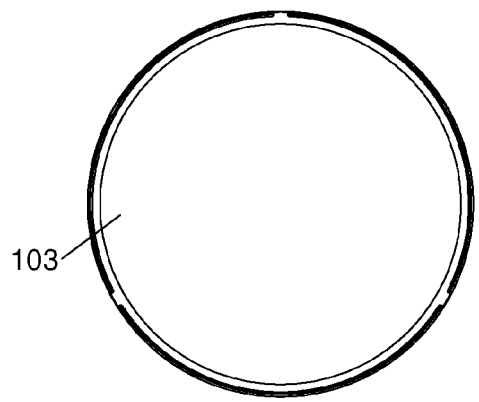
FIG. 14 is a bottom plan view of the piston of the freshness preserving food container.

FIG. 14 is a bottom plan view of the piston 103 of the freshness preserving food container 101 showing the hollow cylindrical underside that receives the engaging member 113 when in use.

Figure 15:
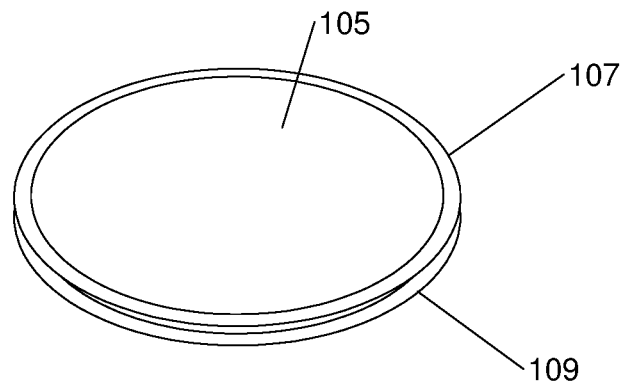
FIG. 15 is a perspective view of the upper support surface and seals of the freshness preserving food container.

FIG. 15 is a perspective view of the upper support surface 105 and seals 107 and 109 of the freshness preserving food container. The upper support surface covers the piston 103 (not shown) and is made from a soft durometer material such as a silicone rubber, rubber or thermoplastic elastomer, or the like. The seals 107 and 109 protrude peripherally outward and may have a slight angle or curve to facilitate ease of entry of the piston 103 into the cylindrical receptacle 101. This also makes the piston uni-directional, allowing for ease of entry and difficult removal. In this arrangement, the peripheral wiper seals 107 and 109 are angled or curved to follow the direction of entry of the piston 103 into the cylindrical receptacle 101. The seals prevent migration of food, liquid or solid, from the freshness preserving food container 100 to the outside environment and also prevent the unwanted entry of air into the inner volume of the freshness preserving food container 100.

Figure 16:
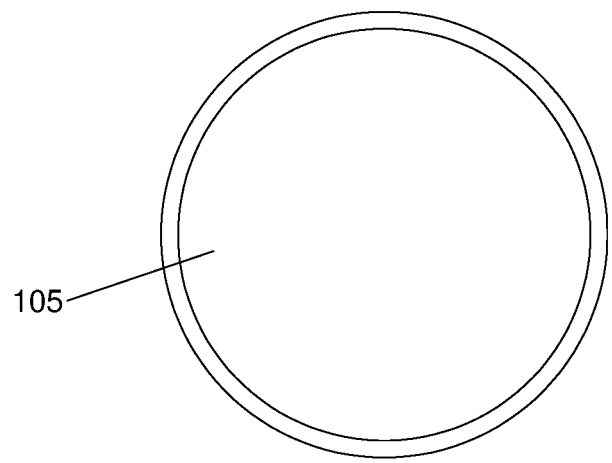
FIG. 16 is a top plan view of the upper support surface and seals of the freshness preserving food container.
Figure 17:
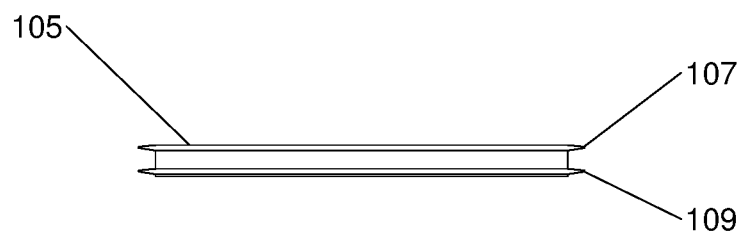
FIG. 17 is a side plan view of the upper support surface and seals of the freshness preserving food container.

FIG. 16 is a top plan view of the upper support surface 105 and seals 107 and 109 of the freshness preserving food container 100. FIG. 17 is a side plan view of the upper support surface 105 and seals 107 and 109 of the freshness preserving food container 100. A slight downward curve of the seals can be seen in FIG. 17. While not pronounced, the peripheral wiper seals 107 and 109 become thinner toward their outer edge. When the upper support surface 105 and associated peripheral wiper seals 107 and 109 are placed on the piston 103 (see FIG. 1) and installed in the cylindrical receptacle 101, they will take on a more pronounced downward angle or curve that in turn facilitates improved sealing. This downward curve or "mushrooming" is the result of the upper support surface and seal combination being of a greater diameter than the inner diameter(s) of the cylindrical receptacle 101.

Figure 18:
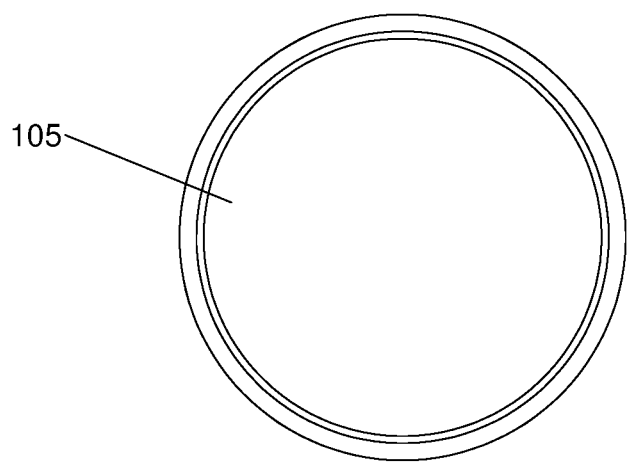
FIG. 18 is a bottom plan view of the upper support surface and seals of the freshness preserving food container.

FIG. 18 is a bottom plan view of the upper support surface 105 and seals 107 and 109 of the freshness preserving food container 100. The underside or bottom surface is recessed, hollow or otherwise concave to accommodate placement on the piston 103.

Figure 19:
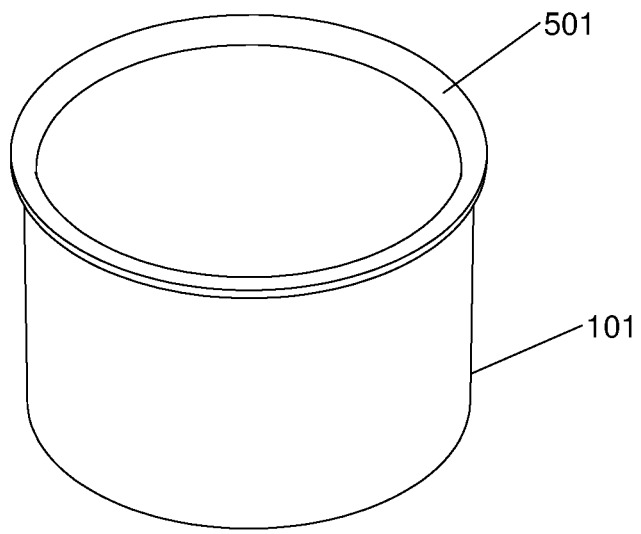
FIG. 19 is a perspective view of the cylindrical receptacle of the freshness preserving food container.

FIG. 19 is a perspective view of the cylindrical receptacle 101 of the freshness preserving food container 100. The peripheral flange 501 can be seen protruding outwardly from the cylinder itself. The cylindrical receptacle forms the walls of the freshness preserving food container 100 with the piston 103 serving as a bottom that can vary in displacement and result in varying inner volume of the freshness preserving food container. The lid 117 is secured by cooperative engagement with the peripheral flange 501.

Figure 20:
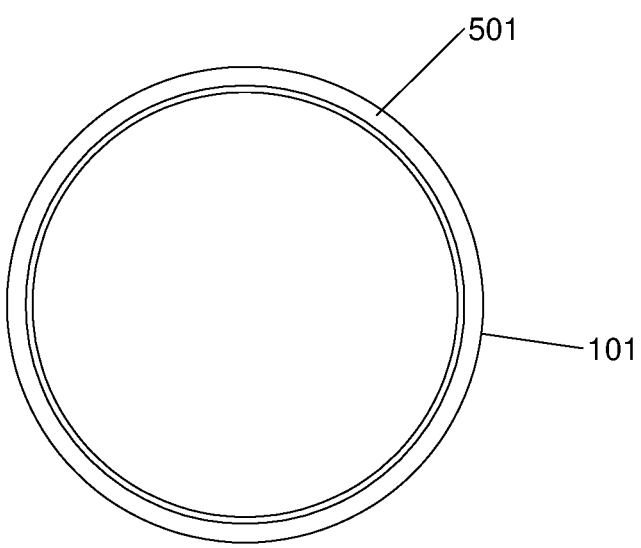
FIG. 20 is a top plan view of the cylindrical receptacle of the freshness preserving food container.

FIG. 20 is a top plan view of the cylindrical receptacle 101 of the freshness preserving food container 100 showing the outwardly protruding peripheral flange 501. FIG. 21 is a side view of the cylindrical receptacle 101 of the freshness preserving food container 100. The peripheral flange 501 can be seen as a generally square or rectangular protrusion, in some embodiments with a slight recess on the underside, as more clearly seen in FIG. 22, which is a cross-sectional view of the cylindrical receptacle 101 of the freshness preserving food container 100 taken along line D-D of FIG. 21.

It should be noted that in some preferred embodiments of the present invention, the inner diameter of the cylindrical receptacle 101 is slightly wider at the bottom than at the top. This can be seen in FIG. 22 where the wall thickness of the cylindrical receptacle 101 is somewhat reduced toward the bottom. Such a taper or gradual variation in diameter changes the draft angle of the wiper seals interaction with the cylindrical receptacle 101. Thus, as the piston 103 (see FIG. 1) is pushed upward by the engaging member 113, the peripheral wiper seals 107 and 109 (again, see FIG. 1) become tighter and more secure, preventing the stored food product from migrating outside of the formed storage area, and also preventing the piston from becoming skewed or otherwise misaligned in the cylindrical receptacle 101.

FIG. 23 is a bottom plan view of the cylindrical receptacle 101 of the freshness preserving food container 100. The cylindrical receptacle 101 may be made from any suitable material such as a plastic. In some embodiments of the present invention, the cylindrical material is clear or opaque and is made from such a suitable material such as a clear plastic or clear polymer such as a copolyester.

Figure 24:
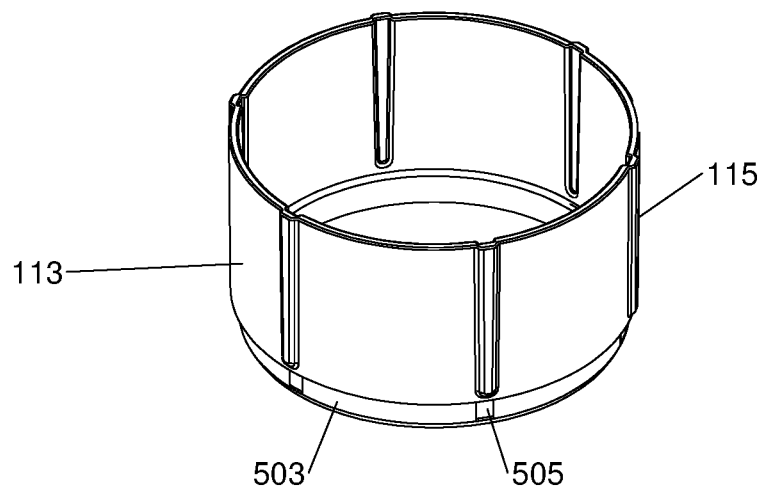
FIG. 24 is a perspective view of the engaging member of the freshness preserving food container.

FIG. 24 is a perspective view of the engaging member 113 of the freshness preserving food container 100. The engaging member 113 having been previously described as having a coupling 503 to engage with the piston 103 while the freshness preserving food container is in use. The engaging member also may have ridges 115, which may protrude outward and have a flush interior joining surface, or the interior surface may be recessed or otherwise follow the outer contour of the ridges 115. There may also, in some embodiments of the present invention, be coupling ridges 505 to facilitate insertion and removal of the coupling 503 of the engaging member 113.

Figure 25:
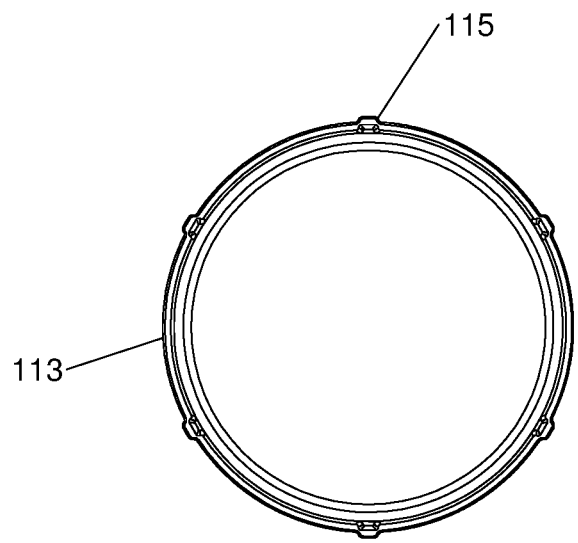
FIG. 25 is a bottom plan view of the engaging member of the freshness preserving food container.

FIG. 25 is a bottom plan view of the engaging member 113 of the freshness preserving food container 100. The engaging member 113 in one embodiment is a cylinder of varying diameter (to create the coupling 503) without a top or bottom surface.

Figure 26:
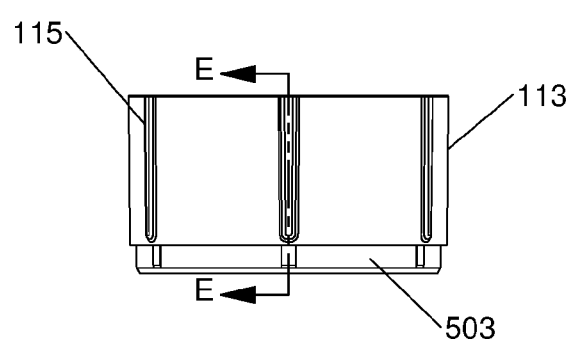
FIG. 26 is a side plan view of the engaging member of the freshness preserving food container.
Figure 27:
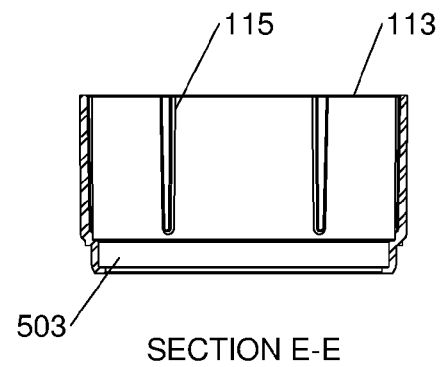
FIG. 27 is a cross-sectional view of the engaging member of the freshness preserving food container taken along line E-E of FIG. 26.
Figure 28:
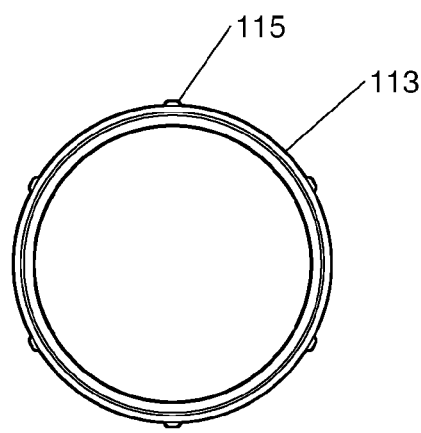
FIG. 28 is a top plan view of the engaging member of the freshness preserving food container.

FIG. 26 is a side plan view of the engaging member of the freshness preserving food container that clearly shows the coupling 503 and the step or edge created at the transition of the engaging member 113 and the coupling 503. FIG. 27 is a cross-sectional view of the engaging member 113 of the freshness preserving food container 100 taken along line E-E of FIG. 26. The structure of the coupling 503 can be clearly seen. FIG. 28 is a top plan view of the engaging member 113 of the freshness preserving food container 100. The various transitions in diameter to create the coupling and peripheral flange, for example, can be clearly seen.

Figure 29:
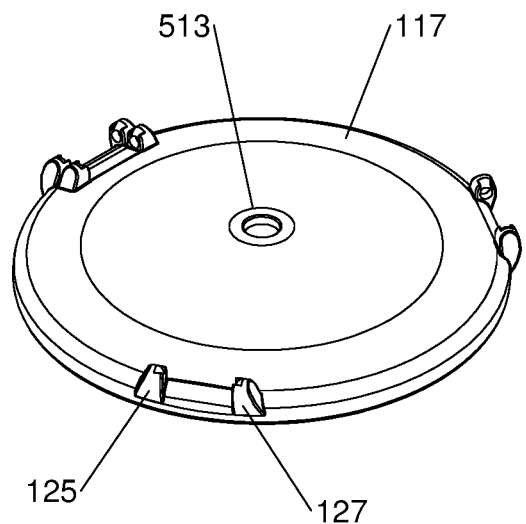
FIG. 29 is a perspective view of the lid of the freshness preserving food container.
Figure 30:
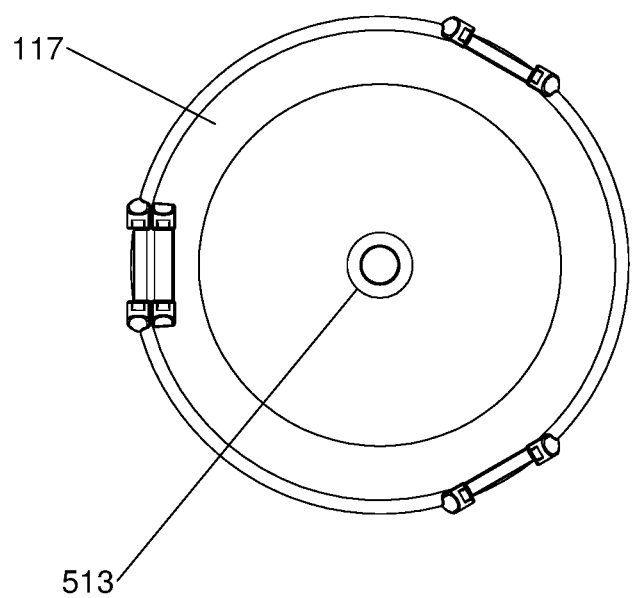
FIG. 30 is a top plan view of the lid of the freshness preserving food container.
Figure 31:
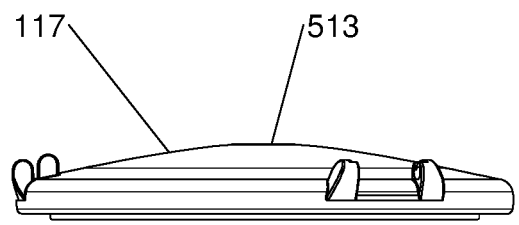
FIG. 31 is a side plan view of the lid of the freshness preserving food container.

FIG. 29 is a perspective view of the lid 117 of the freshness preserving food container 100. The retention sockets for the latches (not shown) can be seen as well as the vent 513 that is shown by example as a circular hole at the center point of the lid 117. The lid also, in this embodiment depicted, is convex with the vent 513 at the apex or peak of the convex lid. FIG. 30 is a top plan view of the lid 117 of the freshness preserving food container 100. A double set of retention sockets can be seen to the left of the drawing to accommodate the lever cap 129 as well as a latch (neither are shown in FIG. 29, see FIG. 1). FIG. 31 is a side plan view of the lid 117 of the freshness preserving food container 100. The convex shape of the lid 117 can be seen in this view, with the vent 513 at the apex.

Figure 32:
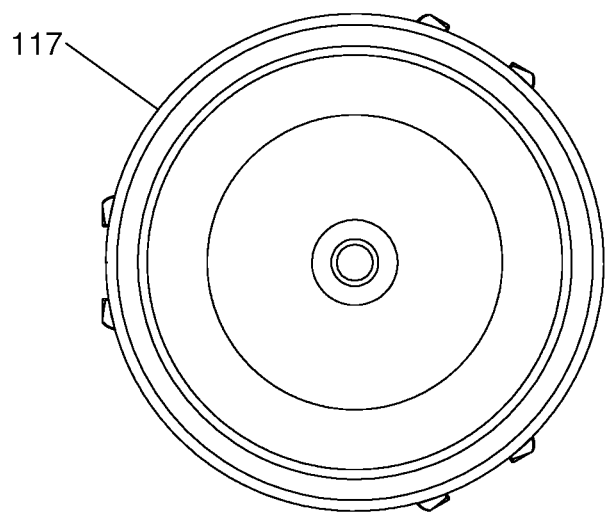
FIG. 32 is a bottom plan view of the lid of the freshness preserving food container.

FIG. 32 is a bottom plan view of the lid 117 of the freshness preserving food container 100. A channel formed by two peripheral walls can be seen around the outer perimeter of the bottom view of the lid 117. An annular sealing ring 517 (see FIG. 46 and FIG. 5) is retained in this channel and serves to seal the lid 117 to the cylindrical receptacle 101 to provide an air and liquid tight seal.

FIGS. 33-36 depict various views of the latch that is mounted to retention sockets on the lid 117 to facilitate retention and sealing of the lid 117 to the cylindrical receptacle 101. FIG. 33 is a perspective view of the latch of the freshness preserving food container 100. While a first latch 119, a second latch 121 and a third latch 123 are depicted herein, other combinations, quantities and configurations of latches are considered within the spirit and broad scope of the present invention as described, depicted and envisioned herein. The latch has a curved surface to engage with and retain the peripheral flange 501 of the cylindrical receptacle 101. The curved surface may also have a lip or edge to facilitate engagement with the peripheral flange 501. A roller 3305 is connected to or formed with the latch and comprises a first pin 3301 and a second pin 3303 on opposing ends. These pins engage with, and are retained by, the retention sockets on the lid, such as the first retention socket 125 and the second retention socket 127 that can be seen in FIG. 1.

FIG. 34 is a top plan view of a latch of the freshness preserving food container 100. FIG. 35 is a bottom plan view of a latch of the freshness preserving food container 100. FIG. 36 is a side view of a latch of the freshness preserving food container 100 that shows the lip or edge on the curved surface and the overall structure of the latch necessary for engagement with the cylindrical receptacle 101 by cooperative interaction with the peripheral flange 501.

Figure 37:
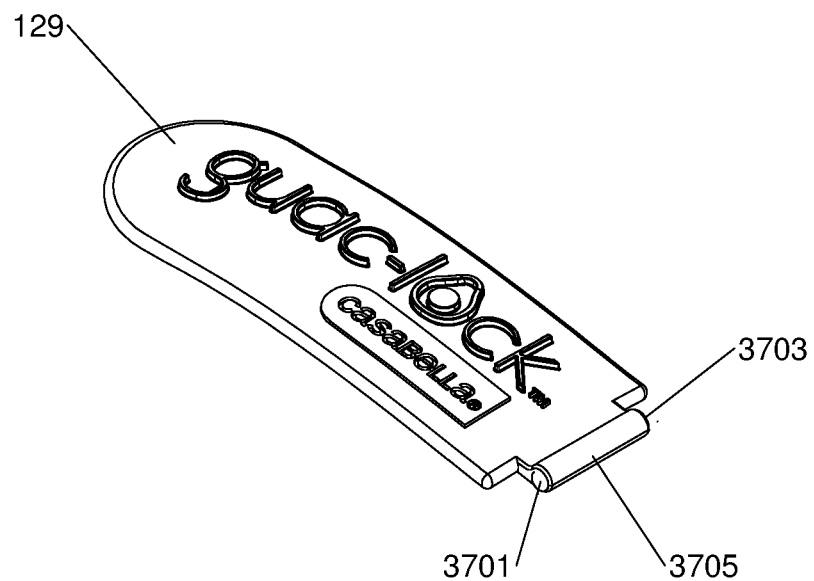
FIG. 37 is a perspective view of the lever cap of the freshness preserving food container.

The lever cap 129 is hingeably connected to the lid 117 and serves to facilitate ease of sealing and removal of the vent plug with the vent 513 of the lid 117. FIG. 37 is a perspective view of the lever cap 129 of the freshness preserving food container 100. Similar to the latches of the present invention, the lever cap 129 has a roller 3705 with a first pin 3701 at a first end of the roller 3705 and a second pin 3703 at a second end of the roller 3705. The pins engage with retention sockets on the lid 117, as seen and described in FIG. 30, for example, and as depicted in FIGS. 1-5. The lever cap 129 has a curve to contour with the convex surface of the lid 117, and also a flare at the far end (non-roller end) to facilitate ease of use.

Figure 38:
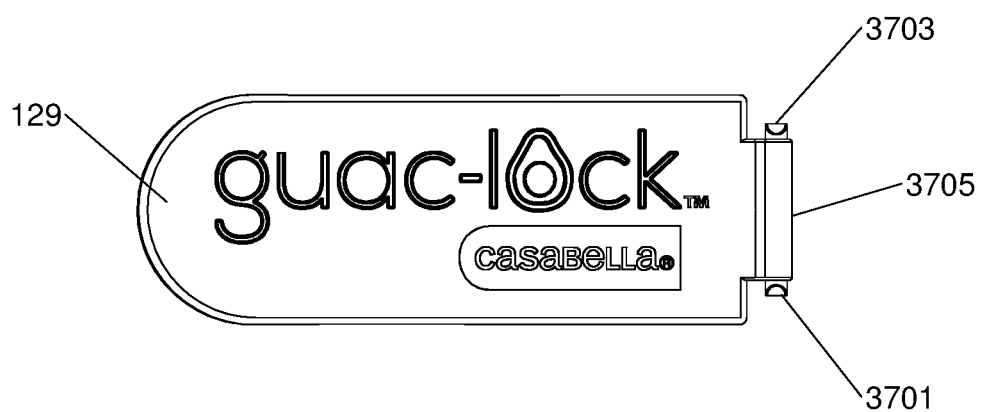
FIG. 38 is a top plan view of the lever cap of the freshness preserving food container.

FIG. 38 is a top plan view of the lever cap 129 of the freshness preserving food container 100 showing a curved and contoured end to lend both aesthetic value as well as functionality to the lever cap 129. FIG. 39 is an end view of the lever cap 129 of the freshness preserving food container 100. A downward protruding sealing plug retainer can be seen, and is more clearly seen in FIG. 41 as the sealing plug retainer 4101. FIG. 40 is a side plan view of the lever cap 129 of the freshness preserving food container 100 where the contour and the upwardly shaped end can be clearly seen. FIG. 41 is a bottom plan view of the lever cap 129 of the freshness preserving food container 100. The sealing plug retainer 4101, a barbed or otherwise variably shaped protrusion to hold a soft durometer sealing plug 515 (see FIG. 5 as well as FIGS. 42-45).

Figure 42:
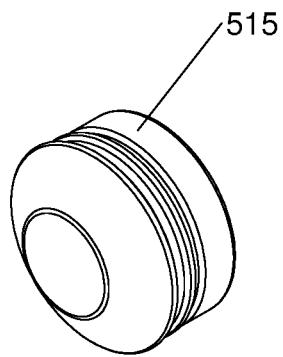
FIG. 42 is a perspective view of the sealing plug of the freshness preserving food container.
Figure 43:
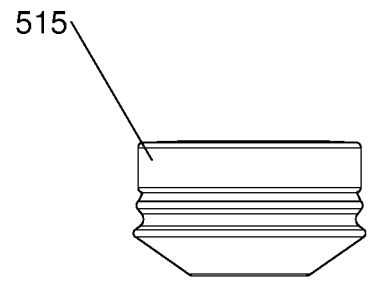
FIG. 43 is a side plan view of the sealing plug of the freshness preserving food container.

FIG. 42 is a perspective view of the sealing plug 515 of the freshness preserving food container 100. The sealing plug 515 is configured to push on and attach to the sealing plug retainer 4101 (see FIG. 41). FIG. 43 is a side plan view of the sealing plug 515 of the freshness preserving food container 100, showing ridges to facilitate retention and a taper to facilitate ease of placement in the vent 513.

Figure 44:
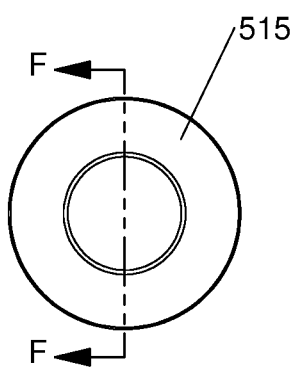
FIG. 44 is a bottom plan view of the sealing plug of the freshness preserving food container.
Figure 45:
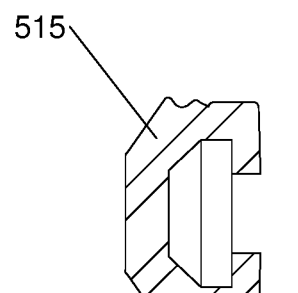
FIG. 45 is a cross-sectional view of the sealing plug of the freshness preserving food container taken along line F-F of FIG. 44.

FIG. 44 is a bottom plan view of the sealing plug 515 of the freshness preserving food container 100. FIG. 45 is a cross-sectional view of the sealing plug 515 of the freshness preserving food container 100 taken along line F-F of FIG. 44. The cavity or recess to accommodate placement on the sealing plug retainer 4101 of the lever cap 129 can be seen.

Figure 46:
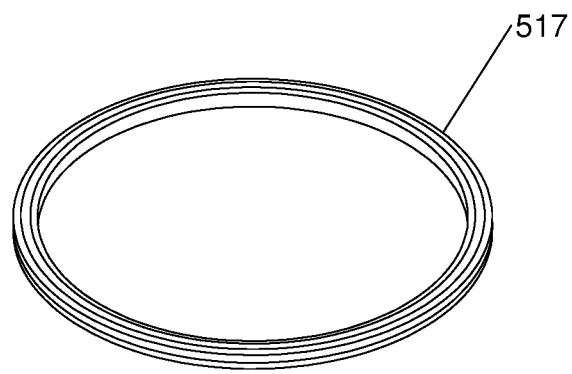
FIG. 46 is a perspective view of the annular sealing ring of the freshness preserving food container.
Figure 47:
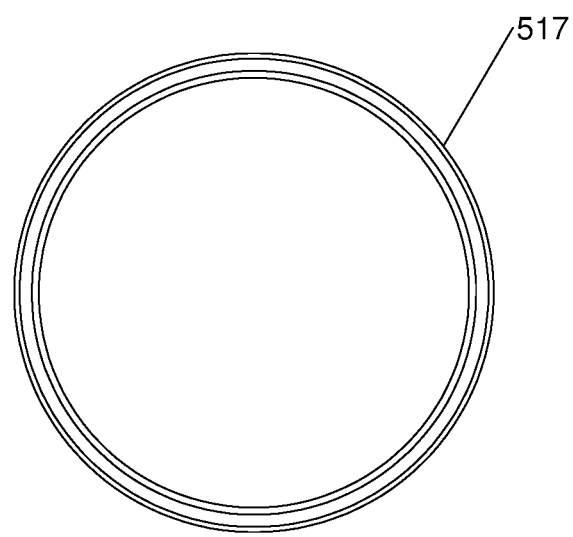
FIG. 47 is a plan view of the annular sealing ring of the freshness preserving food container.

To create a liquid and air tight seal of the lid 117 to the cylindrical receptacle 101, an annular sealing ring 517 is placed in a channel that is formed on the underside of the lid. This channel is formed by two peripheral walls around the outer perimeter of the bottom view of the lid 117, as evident by FIG. 32. FIG. 46 is a perspective view of the annular sealing ring 517 of the freshness preserving food container 100. The annular sealing ring may be a square or rectangular extrusion formed into a ring. Suitable soft durometer materials such as a rubber, silicone rubber, thermoplastic elastomer, or the like may be employed. Lastly, FIG. 47 is a plan view of the annular sealing ring 517 of the freshness preserving food container 100.

To use the freshness preserving food container 100, a perishable food product such as guacamole is placed in the inner volume of the container with the piston 103 fully downward to create maximum inner volume of the container. The lid 117 is placed in position and latched down into place with the lever cap 129 open to allow venting. The engaging member 113 is placed within the underside of the freshness preserving food container 100 and inserted in the underside of the piston 103. The engaging member 113 is then pushed into the cylindrical receptacle 101 such that the piston 103 travels further into the cylindrical receptacle 101, reducing the inner volume of the freshness preserving food container 100. The engaging member 113 continues to push the piston 103 forward until the food product reaches the top or apex of the lid 117. Once the food product fully occupies the inner volume with no airspace, the lever cap 129 is pushed downward such that the sealing plug that is attached to the lever cap 129 engages with and is inserted into the vent 513. The engaging member 113 can then be removed if desired, and the freshness preserving food container 100 stored in an appropriate location such as a refrigerator. When the food product is to be consumed, the lid 117 is removed. To store any remaining food product left in the container, the lid is again secured, and the air removal process is repeated to ready the container for further storage and later use.

It is, therefore, apparent that there has been provided, in accordance with the various objects of the present invention, a freshness preserving food container. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and the attached drawings.

What is claimed is:

1. A container for preserving the freshness of a stored food product, the container comprising:
    a generally cylindrical receptacle having a first open end, an opposing second open end and an inner diameter;
    a piston having an upper surface, a periphery and an exterior diameter that is slightly less than the interior diameter of the generally cylindrical receptacle to allow for placement of the piston within the generally cylindrical receptacle to form a food storage chamber of variable volume;
    a lower surface of the piston defined by a cylindrical recess;
    an upper support surface that removably covers and conforms to the upper surface and periphery of the piston and comprises
    a peripheral wiper seal that creates a generally air and liquid tight seal between the exterior diameter of the piston and the interior diameter of the generally cylindrical receptacle;
    wherein the peripheral wiper seal protrudes co-planar with the upper support surface;
    a generally cylindrical engaging member having an exterior diameter that is less than the interior diameter of the generally cylindrical receptacle and a coupling with a diameter that is less than the external diameter of the generally cylindrical engaging member and with the coupling capable of engaging within the cylindrical recess of the lower surface of the piston to allow for movement of the piston in the generally cylindrical receptacle in order to vary the volume of the formed food storage chamber;
    a lid that is removably securable to the first open end of the generally cylindrical receptacle; and
    a vent located on the lid.

2. The container for preserving the freshness of a stored food product as recited in claim 1, wherein the lid further comprises an annular sealing ring to form an air and liquid tight seal between the lid and the generally cylindrical receptacle.

3. The container for preserving the freshness of a stored food product as recited in claim 1, wherein the generally cylindrical receptacle further comprises a peripheral flange at the first open end of the generally cylindrical receptacle.

4. The container for preserving the freshness of a stored food product as recited in claim 1, wherein the lid further comprises a plurality of latches positioned around a periphery of the lid.

5. The container for preserving the freshness of a stored food product as recited in claim 4, wherein the latches engage with the peripheral flange of the generally cylindrically receptacle to create a seal between the lid and the generally cylindrical receptacle.

6. The container for preserving the freshness of a stored food product as recited in claim 1, wherein the removable upper support surface comprises a soft durometer material that conforms to the piston.

7. The container for preserving the freshness of a stored food product as recited in claim 1, wherein the lid includes a convex portion, and wherein the vent is centrally located at an apex of the convex portion.

8. The container for preserving the freshness of a stored food product as recited in claim 7, further comprising a lever cap having a roller end and a far end and engageable with the vent to selectively seal the vent.

9. The container for preserving the freshness of a stored food product as recited in claim 8, wherein the lever cap is pivotally coupled to the lid.

10. The container for preserving the freshness of a stored food product as recited in claim 8, wherein the lever cap is formed with a flare at the far end to provide ease of opening.

11. The container for preserving the freshness of a stored food product as recited in claim 1, wherein the peripheral wiper seal is formed with the upper support surface.

12. A container for preserving the freshness of a stored food product, the container comprising:
    a generally cylindrical receptacle having a first open end, an opposing second open end and an inner diameter;

a piston having an upper surface, a periphery and an exterior diameter that is slightly less than the interior diameter of the generally cylindrical receptacle to allow for placement of the piston within the generally cylindrical receptacle to form a food storage chamber of variable volume;

a lower surface of the piston defined by a cylindrical recess;

an upper support surface that removably covers and conforms to the upper surface and periphery of the piston and comprises a peripheral wiper seal that creates a generally air and liquid tight seal between the exterior diameter of the piston and the interior diameter of the generally cylindrical receptacle;

wherein the peripheral wiper seal protrudes co-planar with the upper support surface;

a generally cylindrical engaging member having an exterior diameter that is less than the interior diameter of the generally cylindrical receptacle and a coupling with a diameter that is less than the external diameter of the generally cylindrical engaging member and with the coupling capable of engaging within the cylindrical recess of the lower surface of the piston to move the piston in the generally cylindrical receptacle in order to vary the volume of the formed food storage chamber;

a generally cylindrical lid comprising a convex portion;

the generally cylindrical lid configured to be removably securable to the first open end of the generally cylindrical receptacle; and a vent located on the generally cylindrical lid and centrally located at an apex of the convex portion of the generally cylindrical lid.

13. The container for preserving the freshness of a stored food product as recited in claim 12, wherein the lid further comprises an annular sealing ring to form an air and liquid tight seal between the lid and the generally cylindrical receptacle.

14. The container for preserving the freshness of a stored food product as recited in claim 12, wherein the generally cylindrical receptacle further comprises a peripheral flange at the first open end of the generally cylindrical receptacle.

15. The container for preserving the freshness of a stored food product as recited in claim 12, wherein the lid further comprises a plurality of latches positioned around a periphery of the lid.

16. The container for preserving the freshness of a stored food product as recited in claim 14, wherein the lid further comprises a plurality of latches and wherein the latches engage with the peripheral flange of the generally cylindrical receptacle to create a seal between the lid and the generally cylindrical receptacle.

17. The container for preserving the freshness of a stored food product as recited in claim 12, wherein the removable upper support surface comprises a soft durometer material that conforms to the piston.

18. The container for preserving the freshness of a stored food product as recited in claim 12, wherein the peripheral wiper seal is formed with the upper support surface.

19. A kit for creating a container for preserving the freshness of a stored food product, the kit comprising:

a generally cylindrical receptacle having a first open end, an opposing second open end and an inner diameter;

a piston having an upper surface, a periphery and an exterior diameter that is slightly less than the interior diameter of the generally cylindrical receptacle to allow for placement of the piston within the generally cylindrical receptacle to form a food storage chamber of variable volume;

a lower surface of the piston defined by a cylindrical recess;

an upper support surface capable of removably covering and conforming to the upper surface and periphery of the piston, the upper support surface comprising a peripheral wiper seal that creates a generally air and liquid tight seal between the exterior diameter of the piston and the interior diameter of the generally cylindrical receptacle when placed therein;

wherein the peripheral wiper seal protrudes co-planar with the upper support surface;

a generally cylindrical engaging member having an exterior diameter that is less than the interior diameter of the generally cylindrical receptacle and a coupling with a diameter that is less than the external diameter of the generally cylindrical engaging member and with the coupling capable of engaging within the cylindrical recess of the lower surface of the piston to move the piston in the generally cylindrical receptacle in order to vary the volume of the formed food storage chamber; and a lid configured to be removably securable to the first open end of the generally cylindrical receptacle.

20. The kit for creating a container for preserving the freshness of a stored food product as recited in claim 19, wherein the lid has a sealable vent.

* * * * *